July 11, 1950     D. L. WAUGH     2,514,429
DOUBLE COG BELT
Filed June 27, 1945
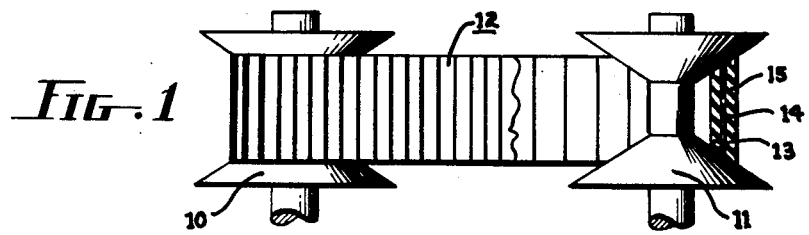
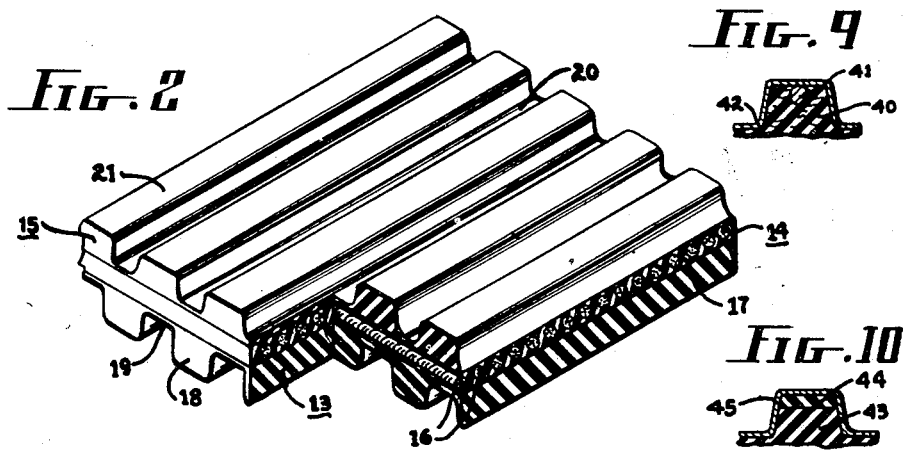
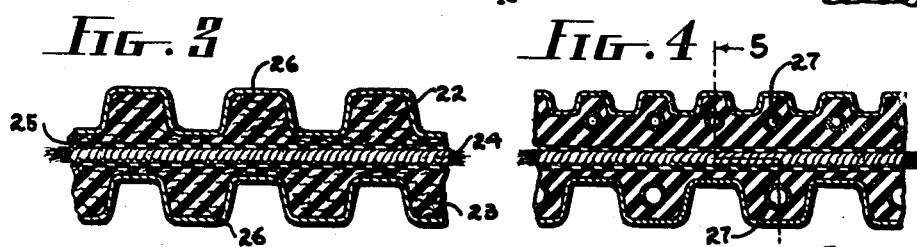
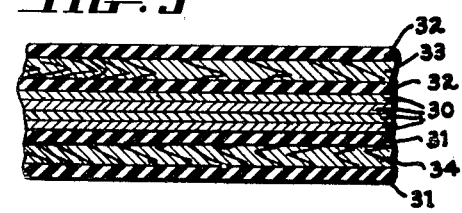
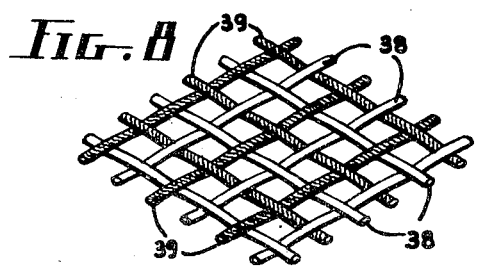
INVENTOR
DALE L. WAUGH
BY
Toulmin & Toulmin
ATTORNEYS Patented July 11, 1950

2,514,429

UNITED STATES PATENT OFFICE 2,514,429

DOUBLE COG BELT

Dale L. Waugh, Dayton, Ohio, assignor to The Dayton Rubber Company, a corporation of Ohio Application June 27, 1945, Serial No. 601,730

14 Claims. (Cl. 74—232)

This invention relates to belts, and particularly to transversely grooved power transmission or conveyor type belts.

For belts which are to be run over pulleys of small diameter, great flexibility is of prime importance, while a certain degree of transverse stiffness and rigidity and resistance to lateral compression is also required. While this is important in the case of all belts, it is of special significance when the belt is employed in variable speed power transmissions. Such variable speed power transmission belts must be relatively wide in order to allow contact in every position of the adjustable pulleys and are thus subject to bending from lateral stress to an especially high degree.

Accordingly, it is one object of this invention to provide a belt which has a high degree of longitudinal flexibility and at the same time a high resistance to bending from lateral compression.

It is another object of this invention to provide a belt which has a maximum effective thickness with regard to lateral rigidity and at the same time a minimum effective thickness with regard to longitudinal flexibility.

These and other objects are accomplished by providing a strength layer in the neutral axis zone of the belt and by strengthening the compression and tension zones against lateral compression.

The invention will be more clearly understood from the following description taken in connection with the accompanying drawings, in which:

Figure 1 is a plan view of a variable speed power transmission belt according to my invention mounted on two adjustable pulleys;

Figure 2 is a perspective view, partly in section, of one embodiment of my invention;

Figure 3 is a cross sectional view of another embodiment of my invention;

Figure 4 is a cross sectional view of still another embodiment of my invention;

Figure 5 is a sectional view taken according to the line 5—5 of Figure 4 but through another modified form of the belt of my invention;

Figure 6, in a perspective view, shows one strengthening member for transversely stiffening the tension and compression zones of the belt;

Figure 7 is a perspective view, partly in cross section, of another type of strengthening member usable for the tension and compression zones of the belt;

Figure 8 shows one modification of a strength band for the neutral axis zone of the belt of my invention;

Figure 9 is a fragmentary cross sectional view showing still another modification of a reinforced cog; and Figure 10 is a fragmentary cross sectional view of still another modification of a reinforced cog.

Referring now to the drawings in detail, there is illustrated in Figure 1 a pair of pulleys 10 and 11 over which a transversely grooved belt, generally designated with 12, is guided. The belt 12 comprises the zones 13, 14 and 15 which, for the sake of simplicity and analogous to belt terminology, will be called hereafter compression zone, neutral axis zone, and tension zone.

The compression zone 13 and the tension zone 15, in the embodiment shown in Figure 2, are built of a rubber-like material which has a high degree of rigidity and the zones are thus resistant to deformation under lateral compression. The neutral axis zone 14 is strengthened by longitudinal cords 16 embedded in a rubber-like composition 17. The compression section is provided with transverse grooves 19 and cogs 18 and the tension section is similarly provided with transverse grooves 20 and cogs 21. It will be noted that the cogs in the tension and compression sections are staggered. This is for the purpose of avoiding thin, weak sections in the belt and also to distribute the traction surface uniformly along its length. Likewise, if the belt is to be used as a conveyor belt, the lateral stiffening is distributed so as to inhibit bending.

In Figure 3 another modification of the belt of my invention is illustrated wherein the tension and compression zones 22 and 23, respectively, are reinforced against transverse compression by substantially parallelly arranged fibers embedded in the rubber composition and disposed in the longitudinal direction of the belt. This particular reinforced rubber composition is generally known in the art as "Stiflex." The longitudinal cords of the neutral axis zone are indicated at 24 and will be seen to be embedded in rubber or a rubber-like composition 25. In the modification shown in Fig. 3 the pitch of the grooves and cogs is the same in both sections; however, weak spots are avoided by arranging the cogs in both sections in a staggered relation so that the thickness of the belt is the same all over. The belt of Figure 3 is a wrapped belt, a fabric layer 26, either straight or preferably bias-laid, surrounding the entire belt body.

In Figure 4 another modification of the belt of my invention is illustrated in which the tension and compression sections each have tubes 27 arranged substantially on the central axis of each cog and in transverse direction. Such tubes, which may be made of any suitable material such as metal, plastic, etc., are effective in preventing deformation of the belt under stress as well as preventing bending of the belt when used as a conveyor. The tubes may be plain tubes or else they may be provided with holes as shown in Fig. 6. In Fig. 6 the tube 28 has a plurality of holes 29 distributed over its entire surface. During vulcanization the rubber composition penetrates the interior of the tubes from the holes in the surface as well as from the sides whereby the tubes are firmly anchored in the rubber composition.

Figure 5 shows still another embodiment of my invention. In this view, 30 represents the longitudinal strength band in the neutral axis zone; it may comprise a plurality of layers of a material having suitable tensile strength, such as cord or fabric layers or suitably flexible metal members any of which may be bonded together with rubber. For the sake of simplicity the longitudinal strength band 30 in Figure 5 is represented as a plurality of layers in section with no specific material being indicated. The compression and tension sections are formed of rubber layers 31 and 32, respectively, in which wooden dowels 33, 34 are transversely arranged.

Figure 7 shows another modification of a reinforcing member suitable for transversely strengthening the tension and compression zones, which comprises a cable 35 built from a number of wire cords 36 embedded in and bonded by rubber material 37.

Figure 8 represents a neutral axis strength band combined of metal and fabric elements. Metal strands 38 alternating with fabric strands 39 are loosely braided so that the rubber adjacent the neutral axis zone may penetrate the interstices of this strength band and thus provide for a firm bond between the reinforcing element and the rubber composition.

Fig. 9 shows just one cog which is, similarly to those of the modification shown in Fig. 4, reinforced by a metal member. However, in this modification the metal member is not arranged in the center of the cog but placed at the tip of the cog immediately under the base fabric. The manufacture of this modification is simpler and consequently cheaper than that of Fig. 4. In Fig. 9, 40 is the Stiflex material of the tension section at the tip of which a metal member 41 is arranged. The fabric layer 42 surrounds the belt.

Figure 10 shows still another modification of a cog. There the tension zone 43, which is made of a relatively soft and flexible rubber material, is reinforced by a tip 44 which is formed from a very hard and resistant rubber material. Also in this modification the belt is wrapped by a fabric layer 45.

It will be understood that a great number of inextensible materials are suitable for the neutral axis strength band. Thus, for example, cords as well as fabric cables, metal mesh, metal bands, plain or perforated, may be used with equal satisfaction.

Likewise, other materials and elements than those mentioned above may be used for the reinforcement of the compression and tension zones. Thus, for instance, wires, bars or tubes of metal or plastic may be used. If metal elements are used, they may be subjected to a preparatory surface treatment in order to increase the bond between the metal and the rubber. Fabric or cord elements prior to their use in the belt may be covered or impregnated with rubber or other materials which enhance the bonding property with the rubber.

By employing grooves of different depth, shape and spacing, the flexibility of the belt may be varied as desired.

It will be readily understood that the belts of this invention have a high longitudinal flexibility and at the same time a high resistance to bending from lateral compression. Furthermore the belts of my invention have a maximum overall thickness and therefore a high degree of rigidity and at the same time extremely thin sections which provide for a high flexibility.

The belts of my invention are preferably made by preforming the cog sections by a press mold plate and then meshing one preformed cog section into a matrix which is arranged on a drum. On this drum the belt body is built by superimposing the various layers, the innermost and outermost layers being formed by a matrix. The belt body, together with the matrices, is then cut into parts corresponding to the approximate size desired of the belts, and the belts with the matrices are then cured in a smooth-surfaced mold. After the belts have been cured, the top and bottom matrices are removed from the cogs. In case that a wrapped belt is to be produced it is possible to form the cogs in the belt after it has been wrapped by curing it in a mold having a properly cogged surface.

The belts described above may be used as a conveyor or as a power or traction belt. They are characterized by great lateral incompressibility, without thereby impairing their flexibility so that they may be run over pulleys of small diameter.

It will be understood that it is desired to be comprehended within this invention such modifications as may be necessary to adapt it to varying conditions and use.

I claim:

1. A belt comprising compression, neutral axis and tension sections, transverse grooves in said compression section and in said tension section, said grooves of said compression section having a substantially greater pitch and greater depth than said grooves of said tension section, said neutral axis section having longitudinally reinforcing elements embedded in rubber composition and said tension and compression sections having a rigid transverse member arranged on the central axis of each cog formed by said grooves.

2. A belt comprising compression, neutral axis and tension sections of rubber-like material, said neutral axis section having longitudinally reinforcing elements embedded in rubber composition, and transverse grooves in said compression section and in said tension section, said grooves of said compression section having a substantially greater pitch than said grooves of said tension section.

3. A belt comprising compression, neutral axis and tension sections of rubber-like material, said neutral axis section having longitudinally reinforcing elements embedded in rubber composition, and transverse grooves in said compression section and in said tension section, said grooves of said compression section having a substantially greater pitch and greater depth than said grooves of said tension section.

4. A belt comprising compression, neutral axis and tension sections, transverse grooves in said compression section and in said tension section, said grooves of said compression section having a substantially greater pitch and greater depth than said grooves of said tension section, said neutral axis section having longitudinal reinforcing elements embedded in rubber composition, and said tension and compression sections each comprising a plurality of rigid transverse tublar members, one each arranged on the central axis of each cog formed by said grooves.

5. A belt comprising compression, neutral axis and tension sections, transverse grooves in said compression section and in said tension section, said grooves of said compression section having a substantially greater pitch and greater depth than said grooves of said tension section, said neutral axis section having longitudinal reinforcing elements embedded in rubber composition, and said tension and compression sections each comprising a plurality of rigid transverse dowels which enhance the lateral strength of said belt, one of said dowels each arranged on the central axis of each cog formed by said grooves.

6. A belt comprising compression, neutral axis and tension sections, said neutral axis section having longitudinal reinforcing elements embedded in rubber composition, transverse grooves in said compression section and in said tension section, said grooves of said compression section having a substantially greater pitch and greater depth than said grooves of said tension section, and said tension and compression sections each comprising a plurality of transverse cables for enhancement of the lateral strength of said belt.

7. A belt comprising compression, neutral axis and tension sections, transverse grooves in said compression section and in said tension section, said grooves of said compression section having a substantially greater pitch and greater depth than said grooves of said tension section, said neutral axis section having a longitudinal reinforcing elements embedded in rubber composition, and said tension and compression sections each comprising a plurality of perforated tubes transversely arranged so that the rubber penetrates the said tubes from all sides and provides a firm bond between said tubes and the rubber composition, one of said tubes each being located on the central axis of each cog formed by said grooves.

8. A belt comprising compression, neutral axis and tension sections, said neutral axis section having a longitudinal reinforcing band embedded in rubber composition and longitudinally disposed, said tension and compression sections comprising laterally disposed reinforcing members which provide for lateral incompressibility, and transverse grooves in said compression section and in said tension section, said grooves of said compression section having a substantially greater pitch and greater depth than said grooves of said tension section.

9. A belt comprising compression, neutral axis and tension sections, said neutral axis section having cords embedded in rubber composition and longitudinally disposed, said tension and compression sections comprising rubber-like material having a high degree of rigidity which provides for lateral incompressibility, and transverse grooves in said compression section and in said tension section, said grooves of said compression section having a substantially greater pitch and greater depth than said grooves of said tension section.

10. A belt comprising compression, neutral axis and tension sections, said neutral axis section having longitudinal reinforcing elements embedded in rubber composition, and said tension and compression sections comprising rubber-like material having a high degree of rigidity which provides for lateral incompressibility, said belt having a fabric cover wrapped around its outer surface, and transverse grooves in said compression section and in said tension section, said grooves of said compression section having a substantially greater pitch and greater depth than said grooves of said tension section.

11. A belt comprising compression, neutral axis and tension sections, said neutral axis section having longitudinal reinforcing elements embedded in rubber composition, said tension and compression sections comprising rubber-like material having a high degree of rigidity which provides for lateral incompressibility, said belt having a bias laid fabric cover wrapped around its outer surface, and transverse grooves in said compression section and in said tension section, said grooves of said compression section having a substantially greater pitch and greater depth than said grooves of said tension section.

12. A transversely grooved wrapped belt comprising neutral axis, compression and tension sections, said neutral axis section having longitudinally reinforcing elements embedded in rubber composition, and said tension and compression sections each having grooves transversely arranged at their surface and cogs between said grooves, each of said cogs having a transverse strengthening member consisting of a section of rubber material harder than that of said cog and arranged at the tip thereof, whereby the lateral compressibility is reduced to a minimum, said grooves of said compression section having a pitch different from that of said grooves of said tension section.

13. A belt comprising compression, neutral axis and tension sections, said neutral axis section having longitudinal reinforcing elements embedded in rubber composition, transverse grooves in said compression section and in said tension section, said grooves of said compression section having a substantially greater pitch and greater depth than said grooves of said tension section, and said tension and compression sections each comprising a plurality of transversely arranged lateral strength members, one of said strength members being located adjacent the tip of each cog formed by said grooves of said belt.

14. A belt comprising compression, neutral axis and tension sections, transverse grooves in said compression section and in said tension section, said grooves of said compression section having a substantially greater pitch and greater depth than said grooves of said tension section, said neutral axis section having longitudinal reinforcing elements embedded in rubber composition, and said tension and compression section each comprising a plurality of rigid transverse rods, one each arranged on the central axis of each cog formed by said grooves.

DALE L. WAUGH.

REFERENCES CITED

The following references are of record in the file of this patent:

UNITED STATES PATENTS

| Number | Name | Date |
|---|---|---|
| 1,475,250 | Sundh | Nov. 27, 1923 |
| 1,883,821 | Reeves | Oct. 18, 1932 |
| 1,890,080 | Freedlander | Dec. 6, 1932 |
| 1,982,869 | Heyer | Dec. 4, 1934 |
| 2,167,384 | Freedlander | July 25, 1939 |
| 2,189,049 | Ungar | Feb. 6, 1940 |
| 2,194,833 | Nassimbene | Mar. 26, 1940 |
| 2,211,202 | Freedlander | Aug. 13, 1940 |
| 2,343,367 | Conradson | Mar. 7, 1944 |
| 2,348,522 | Case | May 9, 1944 |
| 2,430,024 | Luaces | Nov. 4, 1947 |

FOREIGN PATENTS

| Number | Country | Date |
|---|---|---|
| 6,846 of 1912 | Great Britain | Aug. 28, 1913 |
| 365,293 | Great Britain | Jan. 21, 1932 |